Aug. 19, 1969  P. J. BODDY ET AL  3,462,712
OPTICAL MODULATOR
Filed Nov. 23, 1966
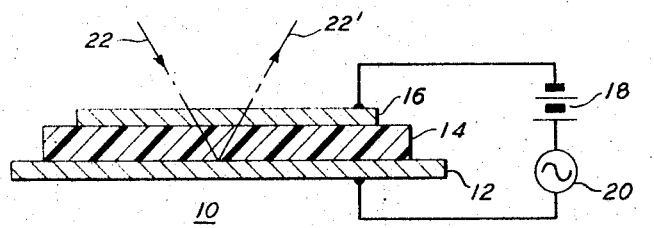
INVENTORS P.J. BODDY
A.F. FROVA
BY
ATTORNEY

United States Patent Office 3,462,712
Patented Aug. 19, 1969

3,462,712
OPTICAL MODULATOR
Philip J. Boddy, Short Hills, and Andrea F. Frova, North Plainfield, N.J., assignors to Bell Telephone Laboratories, Incorporated, Murray Hill, N.J., a corporation of New York
Filed Nov. 23, 1966, Ser. No. 596,498
Int. Cl. H01s 3/10
U.S. Cl. 332—7.51          5 Claims This invention relates to the modulation of an optical beam in accordance with modulating information.

Currently, considerable effort is being expended on the development of an optical communication system because of the known advantages of such a system. Important to such a system is the efficient modulation of the optical beam, serving as the carrier, in accordance with the information to be transmitted. Although various modulation techniques have been proposed hitherto, most of them suffer from one or more faults and, in general, a completely satisfactory technique is yet to be developed. Common failings of known modulation techniques include the low index of modulation readily attainable and the large amount of modulating energy needed.

The present invention is based upon the discovery that a metal oxide, such as titanium dioxide, when placed in the path of an optical beam, absorbs optical energy in varying degrees in accordance with an applied electric field, when the photon energy of the beam exceeds the band gap energy of the metal oxide. Although most metal oxides should exhibit this property to some degree, it has been found that the magnitude of the effect is considerably greater in titanium dioxide than in any other oxide tested.

In an optical modulator in accordance with the present invention, the light to be modulated is transmitted through a thin film of titanium dioxide, in which a high electrical field is established, and the modulating intelligence is used to vary the strength of the electric field whereby the amount of light absorbed is varied correspondingly. In particular, the incident light is chosen to have photon energies larger than the forbidden energy band or gap characteristic of titanium dioxide.

A feature of a preferred embodiment of the invention is that the thin film of titanium dioxide is provided with a reflecting electrode on one side and a transparent electrode on the other side where the optical beam to be modulated is made incident (preferably nearly normal incidence). It has been found that the absorption of the beam transmitted through the titanium dioxide thin film is highly dependent on the electric field therein. For modulation, a voltage is established across the thin film, and this voltage is varied in accordance with the modulating information whereby the intensity of the transmitted beam (after traversing the thin film twice due to the presence of the reflecting electrode) varies accordingly and a modulated beam results.

The absorption phenomenon upon which the invention is based is to be contrasted with electroreflectance, a reflection phenomenon. In optical modulators employing an electroreflectance crystal (for example, potassium tantalate) it is important that the crystal be a conductor or semiconductor in order to establish a rectifying surface barrier at the crystal face from which the beam is reflected. Modulation of the reflected beam is achieved by varying in accordance with modulating information the electric field, and hence the reflectivity, in the space charge layer associated with such surface barrier. Such an optical modulator is disclosed in copending application of P. J. Boddy and A. F. Frova, Ser. No. 536,033, filed Mar. 21, 1966.

In the present invention, it is preferable that the absorptive metal oxide be an insulator in order that the electric field be established throughout the thin film, and not just in the small region of a surface barrier. In fact, no surface barrier is formed at all in the present invention. It is also advantageous that the metal oxide be a thin film, and not a single crystal, in order that the incident beam be transmitted through the metal oxide. In the present state of the technology it has generally not been possible to form single crystal thin films.

When the beam of light to be modulated is directed at a titanium dioxide thin film at nearly normal incidence, it has been possible to achieve readily a modulation index in excess of twenty per cent with a modulating voltage of about forty volts.

The above and other features of the invention, together with its various advantages, can be easily understood from the following more detailed description taken with the accompanying drawing in which:

The figure shows schematically an illustrative embodiment of the invention.

With reference now to the figure, the modulator 10 comprises a substrate 12 of titanium on which has been anodically grown a thin film 14 of titanium dioxide which has the property of high polarizability, i.e., its crystalline structure is readily distorted by an applied electric field. This property is generally found in metal oxides having a high dielectric constant, e.g., the dielectric constant of titanium dioxide is about 89 along its $a$-axis and about 173 along its $c$-axis. The thin film of titanium dioxide can be formed by other well-known techniques (e.g., sputtering) in which case the substrate 12 could be any other suitable material, and need not be titanium. Deposited on the thin film 14 is a transparent electrode 16, typically a thin film of gold or tin oxide. Across the substrate 12 and electrode 16 is serially connected a bias voltage source 18 and a modulating signal source 20.

The optical beam 22 to be modulated is made incident on the transparent electrode 16. The beam 22, which is transmitted through both the electrode 16 and the thin film 14 of titanium dioxide, is then reflected from the titanium substrate 12 and retransmitted through the thin film 14 and electrode 16. Although not shown in the figure, the beam 22 actually undergoes multiple reflections between the electrode 16 and the substrate 12 before emerging as beam 22'. The beam 22, therefore, traverses the thin film 14 a multiple of times before emerging as beam 22'. The electric field, established across the titanium dioxide thin film 14 by bias voltage source 18, is varied in accordance with modulating information in voltage form supplied by source 20, thereby to vary accordingly the absorption coefficient of the titanium dioxide and hence to amplitude modulate the retransmitted beam 22'.

In particular, for light at about $0.33\mu$ (i.e., 3.75 ev.) incident on the titanium dioxide thin film about 400 A. thick, for a DC bias of 20 volts (i.e., electric field of about $5 \times 10^6$ v./cm.), and for a modulating voltage of 40 volts peak to peak AC, it has been found that a modulation index of at least 20 percent is attainable.

In a system of the kind described it has been found that the average absorption coefficient $\alpha$ varies from about $0.35 \times 10^5$ cm.$^{-1}$ to $8.9 \times 10^5$ cm.$^{-1}$ for incident beam photon energies in the 3.5 to 4.0 electron volt range. The absorption coefficient is an average because of two factors: (1) titanium dioxide is anisotropic, and (2) the thin film of anodically grown titanium dioxide is polycrystalline. At 3.75 ev. the average $\alpha = 2.8 \times 10^5$ cm.$^{-1}$ which corresponds to approximately 10 percent of the incident beam intensity being retransmitted through the 400 A. thin film 14, which in most instances is more than adequate. It is this 10 percent beam which is 20 percent modulated.

The foregoing dimensions, materials and examples are illustrative only and are not to be construed as limitations upon the scope of the invention.

The light to be modulated is provided from a suitable source, not shown, and for practical reasons, it is found advantageous to have the angle of incidence about 4 degrees from the normal. Smaller angles of incidence tend to make difficult the separation of incident and retransmitted beams and increased angles tend to increase the illuminated area of titanium dioxide.

The phenomenon that appears to be primarily responsible for the change in absorption is fundamental band to band optical transitions. To this end the photon energies should be larger than the width of the forbidden energy band or gap characteristic of the thin film 14. In the case of titanium dioxide which has an energy gap of about 3.0 electron volts, the photon energies required for the light beam correspond to wavelengths between about 3100 to 3500 A. units. Presently available sources providing light with photon energies in this range include xenon discharge lamps, which provide incoherent light. For coherent light, the output of an argon ion laser can be supplied to a harmonic generator for frequency doubling in known fashion.

It is unnecessary that the incident light beam to be modulated be of high intensity. It has been found possible to achieve a high index of modulation of incident beams of microwatt intensity in a spot one millimeter square. The principal limitation on the intensity of the beam stems from the usual need to avoid overheating.

It is to be understood that the specific embodiments described are merely illustrative of the general principles of the invention, and that other embodiments can be devised by one skilled in the art without departing from the spirit and scope of the invention.

In particular, by a suitable arrangement, a light beam could be modulated at microwave frequencies in accordance with the invention. At microwave frequencies, it should be advantageous to rely on appropriate geometry and microwave circuitry to achieve a high electric field in the titanium dioxide sample. For example, the srystal could be shaped so that it is resonant essentially at the center of the band of modulation frequencies and then it could be incorporated in a microwave resonant cavity at this same frequency such that the sample is in a region of high electric microwave field. The cavity also could be designed to concentrate the electric field in such region.

What is claimed is:
1. Apparatus for modulating an optical beam comprising a thin film of a metal oxide having a high dielectric constant and a characteristic energy gap, and characterized by the property that its absorption of optical energy varies with an applied electric field, means for forming an electric field in said thin film, means for directing an optical beam to be modulated for transmission through said thin film, the beam being characterized by photon energies greater than the energy gap of the metal oxide, means for varying in acordance with modulating information the electric field in said thin film, whereby a modulated optical beam results.

2. Apparatus in accordance with claim 1 wherein said electric field forming means comprises a substrate, said thin film of metal oxide formed on said substrate, a transparent electrode deposited on said thin film, the optical beam being made incident on said electrode for transmission therethrough, for multiple reflection between said substrate and said transparent electrode, and subsequently for retransmission through said thin film and said electrode, and voltage means connected across said substrate and said electrode thereby to form the electric field in said thin film.

3. The apparatus of claim 2 wherein said substrate comprises titanium and said thin film of metal oxide comprises a thin film of titanium dioxide.

4. The apparatus of claim 1 wherein said metal oxide is titanium dioxide.

5. The apparatus of claim 1 wherein, said metal oxide is titonium dioxide having an energy gap of approximately three electron volts and the photon energies of the three and one-half to four electron volts.

References Cited

UNITED STATES PATENTS 3,183,359  5/1965  White _____ 322—7.51

OTHER REFERENCES

Frova et al.: "Physical Review," May 15, 1967, pp. 700–708.

JOHN KOMINSKI, Primary Examiner

DARWIN R. HOSTETTER, Assistant Examiner

U.S. Cl. X.R.

332—53; 350—160